Sept. 10, 1963    W. C. BOHRES ETAL    3,103,409
METHOD FOR MAKING THERMOPLASTIC PIPES
Filed May 6, 1960    2 Sheets-Sheet 1

INVENTORS
WILLIAM CARL BOHRES
REUBEN THOMAS FIELDS
THOMAS FRIEDRICH JORDAN

BY

ATTORNEY

INVENTORS
WILLIAM CARL BOHRES
REUBEN THOMAS FIELDS
THOMAS FRIEDRICH JORDAN

BY
ATTORNEY

3,103,409
METHOD FOR MAKING THERMOPLASTIC PIPES

William Carl Bohres and Reuben Thomas Fields, Wilmington, Del., and Thomas Friedrich Jordan, West Chester, Pa., assignors to E. I. du Pont de Nemours and Company, Wilmington, Del., a corporation of Delaware
Filed May 6, 1960, Ser. No. 27,315
5 Claims. (Cl. 18—55)

This invention relates to a method for making pipe having a smooth internal surface from thermoplastic resins.

The term "pipe" is used herein to signify a self-supporting elongated hollow shape whose principal use is for conveying fluids. Pipes made from thermoplastic resins have a wall thickness of at least 20 mils, and frequently greater than 100 mils. Such structures are to be distinguished from non self-supporting tubular film such as that made by the process described in U.S. Patent 2,461,975 issued to Edward D. Fuller on February 15, 1949. Tubular films are generally 1 mil or less in thickness, and are normally used as protective wrappings and the like.

In making pipe it is usual to extrude the thermoplastic resin by forcing it, in a molten condition, through an annular die-core assembly. Thermoplastic resins do not transmit heat readily and hence cool rather slowly even when cooled by contact with a cold surface. It is therefore necessary to support rigidly the extrudate while it is cooled, until it has attained a self-supporting condition. Heretofore it has been customary to employ a tubular, cooled, forming box attached to the die. The tubing is maintained in contact with the walls as it passes through the box by pressurizing the inside of the pipe with air or other fluid. Pipe formed by cooling from the exterior has a glossy outer surface but the inner surface tends to be rough and to contain minute cracks. The roughness of the inner surface is particularly marked when thermoplastic resins which are partially crystalline, and which have a large volume change on solidification, are employed. This roughness is a serious disadvantage in many applications. It increases the friction between the pipe walls and the moving contents within, thereby seriously increasing pumping power requirements where long lines are employed. Pipe with a rough interior surface is also relatively difficult to clean thoroughly.

It is an object of the present invention to provide a process for producing pipe having improved properties from thermoplastic resins.

Other objects will appear hereinafter.

The above objects are achieved by supplying molten thermoplastic material under pressure, continuously forming a skin of solidified thermoplastic material about a cooled, rigid, support substantially defining the interior of the pipe; withdrawing the skin as it is formed and thereafter forming the outer surface of the pipe; releasing the pressure of the surrounding melt and continuing to cool from the interior of the pipe until the pipe has solidified.

The above process, which has been described in the most general terms, will be better understood by reference to a specific form of apparatus which may be employed to perform the process.

Referring to the drawings which accompany this specification:

Figure 1:
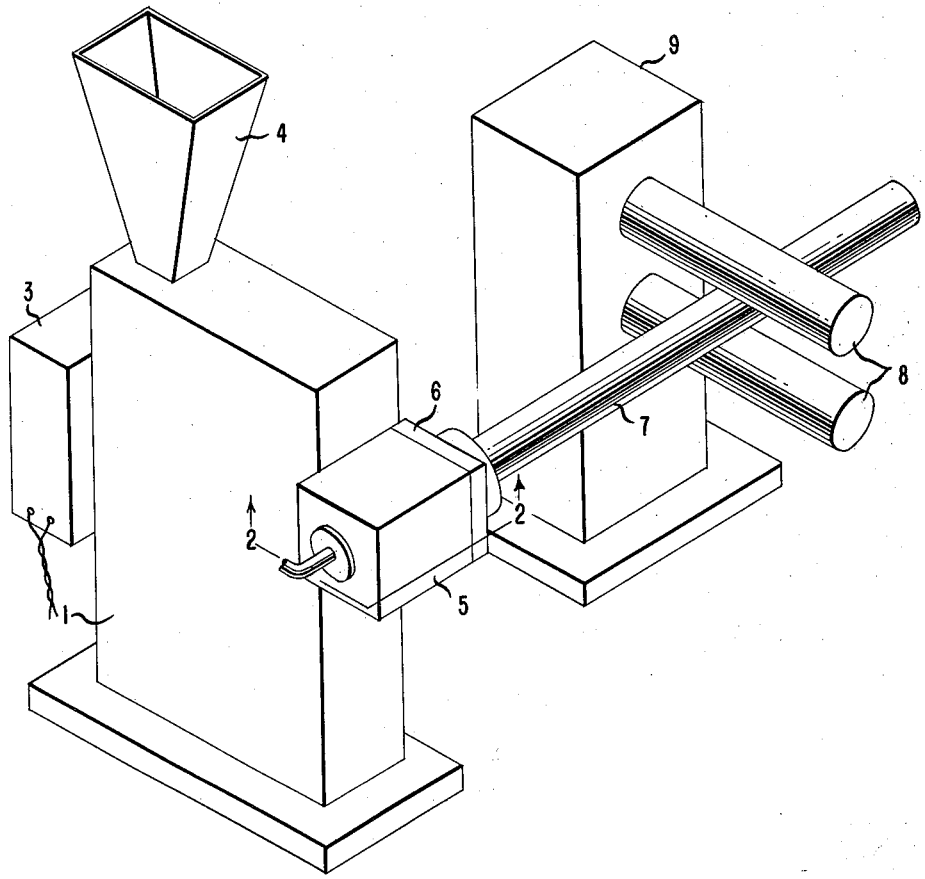
FIGURE 1 shows a general view of the apparatus suitable for the fabrication of pipe by the process of this invention.

Referring to FIGURE 1, in the drawing is shown an extruder 1 for melting thermoplastic materials and pumping the melt. The extruder screw is driven by an electric motor and a variable speed gear train located in box 3. Thermoplastic material in the form of small pellets is fed into the hopper 4 from whence as it is masticated and heated by the mechanical work supplied by the extrusion screw, it is urged towards the crosshead 5 in a molten condition. At the crosshead 5, the molten thermoplastic stream is turned through an angle and thence over the mandrel within the die. A thin elastic skin is formed about the cold section of the mandrel within the die, and while the molten plastic mass is still under pressure generated by the extruder. This skin is withdrawn from the mandrel by the pull-off 8 powered by an electric motor and gearing located at 9, acting on the formed pipe, and assisted by the pressure from the extruder. The outer surface is formed by the die plate 6 as the extrudate leaves the die.

Figure 2:
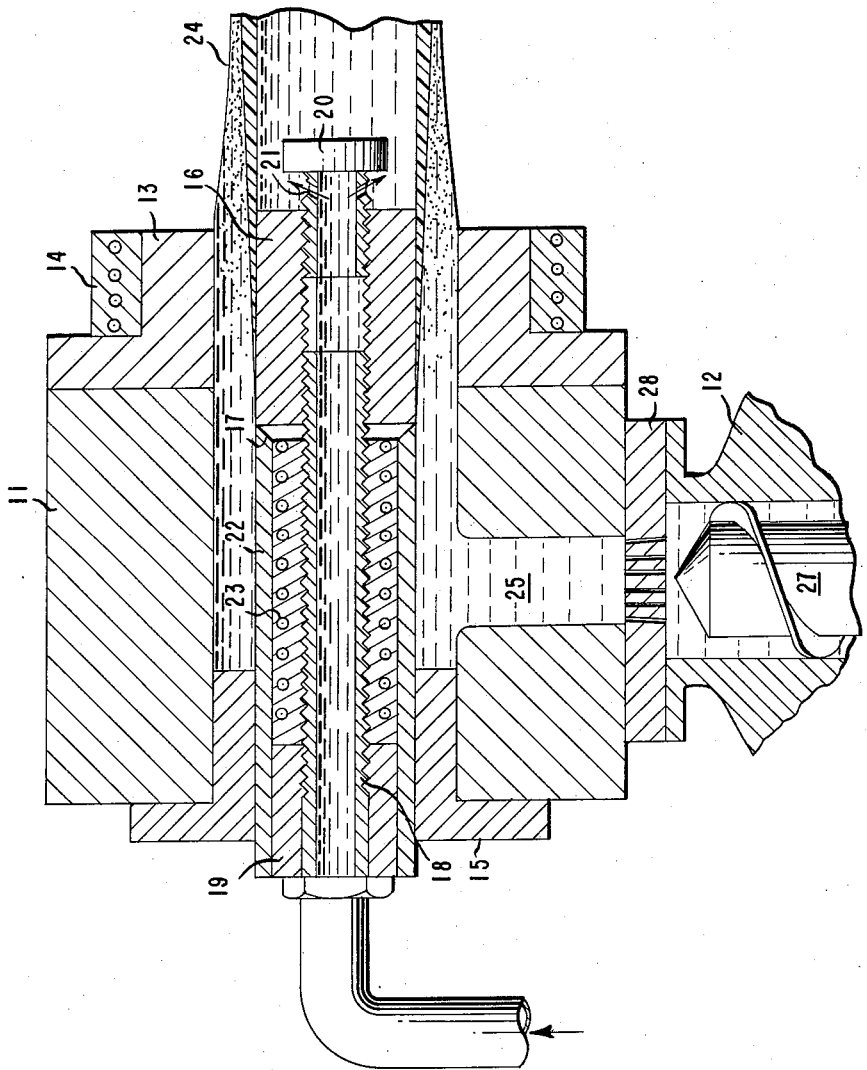
FIGURE 2 shows a cross section of the die and core shown in FIGURE 1 along the line 2—2 of the figure.

Referring now to FIGURE 2 which is a cross sectional view of the crosshead taken along the line 2—2 of FIGURE 1.

The body of the crosshead 11 is attached to the body of the extruder 12 and supports the die 13 which is provided with heating means such as an electrical tape heater 14 wound about the outside of the die. The die is maintained at a temperature above the flow point of the selected thermoplastic material, but below that temperature at which the thermoplastic material decomposes. Within the crosshead and extending axially through the crosshead and the die assembly is a cylindrical mandrel 22 and 16 which defines the inner surface of the extrudate supported by a flange 15 which closes the rear end of the crosshead. The mandrel consists of two principal portions, a cooled section 16 which is thermally insulated from the rest of the mandrel by grinding the inside of the abutting section 22 to a knife edge 17 at the point where it contacts the cooled section. The cooled section of the mandrel 16 is held in place by a threaded pipe 18, which passes through a plug 19 and is screwed into the rearward end of a threaded hole extending completely through the cooled section. In the forward end of the cooled section is screwed a hollow plug 20, with radial holes 21 distributed about the plug. The pipe 18 conveys cooling water to the cooled section 16 and thence through the holes 21 into the body of the extrudate 24, and thence flows out through the fabricated pipe. The heated section of the mandrel consists of a metal shell 22 which has been ground to a knife edge 17 at the point where it contacts the cooled section 16. The shell is spaced from the pipe 18 carrying cooling water by the plug 19. The shell 22 is heated by an electrical resistance heater 23 immediately under its surface and embedded in thermal insulating material, which fills the space between the shell 22 and the pipe 18. By means of the heater 23 the shell is heated to extrusion temperature and a sharp differential in temperature is maintained between the heated and the cooled sections of the mandrel.

In operation, molten thermoplastic 25 is forced through the breaker plate 28 into the crosshead 11 by rotation of the extruder screw 27 and thence through the annular orifice between the heated die 13 and the mandrel 22, 16. A thin skin of solid polymer is formed about the cold mandrel while the body of melt remains fluid at the extrusion temperature, and at a substantial pressure. The skin which is formed appears to be elastic and is readily removed from the mandrel, especially as the pressure of the extruder is released, the skin is drawn through the die wherein the outer surface is formed. Cooling is continued from the interior of the pipe by the mandrel which may extend in part beyond the face of the die, and by cooling water in the interior of the pipe.

The process may be initiated by inserting a prefabricated tube of the thermoplastic resin into the die over the cooled mandrel end and withdrawing the starting tube with the pull-off after starting the flow of plasticated material from the extruder.

The following examples illustrate further the process of the invention as it is applied to different thermoplastic resins; these examples are, however, not intended to limit the scope of the invention.

EXAMPLE I

*Manufacture of Pipe From a Polyoxymethylene Resin*

A high molecular weight polyoxymethylene diacetate resin such as that described and claimed in British Patent 770,717, issued to E. I. du Pont de Nemours and Company, complete specification published March 20, 1957, was employed for the manufacture of pipe in an apparatus similar to that shown in the accompanying drawings and described hereinabove. The thermoplastic resin was plasticated and pumped into the crosshead with a 2 in. extruder fitted with a 20/1 gradual compression screw. The mandrel had an outer diameter of 1.050 in. and a total length of 3½ in., the length of the cooled portion being 1¼ in., ¼ in. protruding beyond the die. The extruder barrel was maintained at a temperature of 190° C., the die temperature was 195° C. Excellent quality pipe having a glossy inner surface was produced at a rate of 24 in. per minute. The wall thickness of the product was about 150 mils. The melt pressure measured inside the crosshead was 1200 lbs./sq. in. In other runs melt pressure varied from as little as 800 lbs./sq. in. to as high as 2350 lbs./sq. in. without deterioration in the quality of the pipe.

EXAMPLE II

*Manufacture of Pipe From Polyhexamethylene Adipamide Resin*

Pipe of excellent quality and having a smooth mirror-finished interior was fabricated from a high molecular weight polyhexamethylene adipamide resin (solution viscosity, as measured by ASTM D-789, of between 225 and 275). The same equipment was employed as in the previous example, the conditions being: Barrel temperature 280–300° C., die temperature 290–300° C. and a crosshead temperature 290° C. The extrusion pressure was 750 lbs./sq. in. measured at the crosshead. The rate of extrusion was 23 in. of pipe/minute. Polyamide compositions are subject to oxidation and discoloration at high temperatures. The appearance of the product was greatly improved by maintaining the hot pipe emerging from the die in a blanket of nitrogen until it had cooled to about 200° C. The dimensions of the product were: Outside diameter 1.365 in., inside diameter 1.000 in.

EXAMPLE III

*Manufacture of Pipe From a High Density Polyethylene Resin*

Pipe of good quality was made from a high density polyethylene having a density (measured after conditioning a shock cooled sample at 100° C. for 1 hour) of 0.94 gm./cc. and having a melt index measured by ASTM D-1238 of about 0.5. The apparatus was as described in the preceding examples. Extrusion conditions were: Barrel temperature 180–190° C., crosshead and die were maintained at a temperature in the range of 190°–200° C. and pipe was formed at the rate of 18½ in./minute.

The cold section of the mandrel may be considered in two parts: (1) the part extending from the end of the heated section to the plane of die face, and (2) the part extending beyond the plane of the die face.

With regard to the length of the second part of the mandrel, this is not highly critical, but in general a length not more than 10% of the length over which the outer surface of the extrudate remains in the liquid state is suitable. Successful run can be made even with the end of the mandrel flush with the face of the die, although for most purposes higher rates of extrusion can be attained when the mandrel protrudes slightly from the die.

The length of the cooled section of the mandrel within the die is more important, but again not highly critical. The desirable length does not appear to depend on the diameter of the pipe, but generally speaking, a longer cold end inside the die should be employed with an increase in extrusion rate. The properties of the polymer being extruded should also be considered. A sharper melting point and a large degree of contraction or solidification require shorter cold section of the mandrel. Subject to these conditions the length of the cold mandrel within the die should be from about ¼ in. to 2 in. in length.

It has been found highly desirable that the temperature along the mandrel should drop abruptly at the junction between the heated end of the mandrel and the cold section. The sections may be thermally insulated from each other by a thin spacer of an insulating material such as polytetrafluoroethylene, asbestos, or like thermally insulating substances, or preferably by a knife edge and airspace, as described hereinabove.

The cold section should be cooled with a stream of cold water or like cooling liquid, although it is also contemplated that a gas might, under certain circumstances, be employed. Ordinarily the cooling fluid is passed from the mandrel into the newly formed interior surface of the pipe where it further cools the extrudate from the interior. A sliding plug within the extrudate supported from the die core by a rod may be employed to confine the cooling fluid to the hot portion of the pipe so that the pipe extrudate is completely filled with coolant in that section, ensuring uniform cooling. If the extrudate is closed with a slideable plug it may be necessary to provide an outlet for the cooling fluid back through the mandrel. Alternatively, the section of extrudate may be filled by extruding upwardly at an angle of about 10° from the horizontal. In the case of small diameter pipe, the flow of coolant is generally sufficiently rapid to insure that the pipe remains filled with cooling fluid without these artifices. In some cases it is also useful to employ the fluid coolant within the pipe under pressure, generally about 50 lbs./sq. in. in order to maintain a circular cross section in the product pipe.

It is necessary that the heated section of the mandrel be maintained at a temperature above the melting point of the polymer being extruded. Due to the restricted space available for the electrical resistance heater, and hence the limited heating capacity of the mandrel and to the unavoidable thermal leakage from the mandrel to the cooling system, this, on occasion, presents some difficulty. In such cases increasing the temperature of the cooling water may greatly assist the operation of the process. It will be realized, however, that the temperature of the cooling water should be well below the solidification point of the selected thermoplastic material.

Under proper extrusion conditions, the extrudate leaves the die having a solidified interior skin about 10–20 mils in thickness, as measured by inserting a needle probe into the melt at the die. A molten outer layer of plastic is present about the skin which is then further cooled from the interior. If the extrudate is completely cooled from the interior a dull, rough, exterior surface is produced by much the same phenomena as those which produce a rough interior surface when a cooled forming box is employed.

A suitable method for improving the outer surface of the pipe is to pass the extruded form through a snugly fitting former of polytetrafluoroethylene resin sheet 1/32 to 1/4 in. in thickness, which smoothes the surface and at the same time forms a water-tight seal. A stream of water is directed at the plastic from the side of the polytetrafluoroethylene sheet away from the die. The molten outer layer of the pipe is then smoothed and shock cooled to produce a smooth glossy surface. Generally speaking the shock-cooling of the outer surface should proceed when the outer molten layer of polymer is about 10 mils in thickness, although quenching may be effectively performed with outer layers of molten thermoplastic up to 100 mils in thickness. In the case of thick-walled pipe it is advantageous to shock-cool only after the development of a fairly thick solidified inner layer (say up to 100 mils) since the stresses set up by the rapid cooling on the exterior tends to offset those imposed by the interior cooling. When thick-walled pipe is made by shock-cooling a thick outer layer, difficulties are experienced with the formation of voids within the walls.

The extrudate pipe is withdrawn from the die by a pull-off, which may consist of a set of rolls driven by a controlled speed electrical drive motor and a gear train or other like take-off devices which are well known in the art. Take-off pressures are moderate under the conditions recited hereinabove and no special equipment is required for this purpose.

With regard to the polymeric materials which may be found in pipe by the process of the invention, it will be realized that any thermoplastic polymer which can be formed into pipe by extrusion of melt, may be processed, according to this invention. In particular the following polymers are suitable for use in this process: Polyamines such as polyhexamethylene adipamide, polyhexamethylene sebacamide and polycaprolactam, polyoxymethylenes such as polyoxymethylene dicarboxylate, polyoxymethylene diether, and polyoxymethylene glycols; low density, highly branched, polyethylene, high density polyethylene, polypropylene, copolymers of ethylene with vinyl monomers such as vinyl acetate, vinyl methyl ether, styrene, divinyl benzene, and 1-olefins containing from 3 to 20 carbon atoms, polyethylene glycol terephthalate, and like polyester resins and polycarbonate resins.

It will be understood that minor amounts of additives such as pigments, fillers, antioxidants, U.V. screening agents, release agents, and the like may be added to the above polymers, without impairing their fabricability by the process of this invention.

We claim:

1. A process for the manufacture of thermoplastic pipe from partially crystalline thermoplastic polymers which comprises, extruding the said thermoplastic polymers with an extruder, at a temperature above the crystalline melting point of the said thermoplastic polymers, through a die having a mandrel extending through said die, whereby a region of pressure is created throughout the thermoplastic within the said die and mandrel assembly, the said pressure being released at the die face, said mandrel having a heated zone rearwardly within the said die in mechanical contact with a cold zone extending at least to the face of the said die, the junction between the said heated zone and said cold zone being within the said region of pressure, continuously solidifying a layer of the thermoplastic about said mandrel, withdrawing an extrudate from the said mandrel while forming the outer surface of the pipe in a molten condition at the die face about the solidified layer, and continuing to cool the pipe from the interior until the pipe has solidified.

2. Process of claim 1 wherein said thermoplastic material is a polyoxymethylene resin.

3. Process of claim 1 wherein said thermoplastic material is a polyamide resin.

4. Process of claim 1 wherein said skin is about 10-20 mils in thickness at the point where the outer surface is formed.

5. The process of claim 1 in which the thermoplastic material is a polymer of ethylene.

References Cited in the file of this patent

UNITED STATES PATENTS

| | | |
|---|---|---|
| 1,049,641 | Astfalck | Jan. 7, 1913 |
| 1,780,948 | Sherman | Nov. 11, 1930 |
| 2,266,956 | Brundage | Dec. 23, 1941 |
| 2,449,355 | Wiley et al. | Sept. 14, 1948 |
| 2,585,112 | Gravesen | Feb. 12, 1952 |
| 2,597,553 | Weber | May 20, 1952 |
| 2,666,947 | Shaw | Jan. 26, 1954 |
| 2,902,716 | Colombo | Sept. 8, 1959 |
| 2,933,769 | Fisher | Apr. 26, 1960 |